United States Patent
Kim et al.

(10) Patent No.: US 10,849,208 B2
(45) Date of Patent: Nov. 24, 2020

(54) METHOD FOR CONTROLLING STREETLIGHT, AND CONTROL APPARATUS USING SAME

(71) Applicant: Neobby, Seoul (KR)

(72) Inventors: Hyeon Il Kim, Seoul (KR); Moon Hum Yang, Incheon (KR)

(73) Assignee: Neobby, Seoul (KR)

( * ) Notice: Subject to any disclaimer, the term of this patent is extended or adjusted under 35 U.S.C. 154(b) by 232 days.

(21) Appl. No.: 16/476,873

(22) PCT Filed: Apr. 5, 2017

(86) PCT No.: PCT/KR2017/003725
§ 371 (c)(1),
(2) Date: Jul. 10, 2019

(87) PCT Pub. No.: WO2017/195986
PCT Pub. Date: Nov. 16, 2017

(65) Prior Publication Data
US 2020/0092973 A1    Mar. 19, 2020

(30) Foreign Application Priority Data

May 10, 2016  (KR) .................. 10-2016-0056862
Jul. 13, 2016  (KR) .................. 10-2016-0088679
(Continued)

(51) Int. Cl.
*G08B 21/00* (2006.01)
*H05B 47/19* (2020.01)
(Continued)

(52) U.S. Cl.
CPC .............. *H05B 47/19* (2020.01); *F21S 8/086* (2013.01); *H05B 39/041* (2013.01);
(Continued)

(58) Field of Classification Search
CPC ...... F21S 2/00; F21S 8/086; F21W 2131/103; H05B 39/041; H05B 47/10; H05B 47/105; H05B 47/155; H05B 47/19; Y02B 20/44
(Continued)

(56) References Cited

U.S. PATENT DOCUMENTS

2007/0014119 A1\* 1/2007 Burkett .................. H05B 47/16
                                                             362/459
2012/0038281 A1\* 2/2012 Verfuerth ............... H05B 45/10
                                                             315/152
(Continued)

FOREIGN PATENT DOCUMENTS

JP    2008-235116 A    10/2008
JP    2012-123921 A     6/2012
(Continued)

OTHER PUBLICATIONS

International Search Report for PCT/KR2017/003725 dated Jun. 29, 2017 from Korean Intellectual Property Office.

*Primary Examiner* — Mark S Rushing
(74) *Attorney, Agent, or Firm* — Revolution IP, PLLC

(57) ABSTRACT

A method for controlling a streetlight, includes: detecting an existence of an object in a preset detection area by using a motion detect sensor; determining whether the object is a new object that approaches the detection area newly or an existing object that has been detected; calculating a size of a lighting zone by using the signal processor; inputting the object existence signal and a lighting zone activation signal to a lighting controller and inputting a signal regarding the size of the lighting zone to a local area wireless communication unit; setting at least one or more streetlights among the plurality of node streetlights adjacent to the first node streetlight and transmitting the lighting zone to activation signal to the additional lighting streetlight; and controlling a
(Continued)

dimming value of the first node streetlight and the lighting zone activation signal and controlling a dimming value of the additional lighting streetlight.

19 Claims, 8 Drawing Sheets

(30) Foreign Application Priority Data

| Aug. 26, 2016 | (KR) | ......................... 10-2016-0109160 |
| Feb. 14, 2017 | (KR) | ......................... 10-2017-0019994 |
| Mar. 2, 2017 | (KR) | ......................... 10-2017-0026946 |

(51) Int. Cl.
| *H05B 47/155* | (2020.01) |
| *H05B 47/105* | (2020.01) |
| *F21S 8/08* | (2006.01) |
| *H05B 39/04* | (2006.01) |
| *F21W 131/103* | (2006.01) |

(52) U.S. Cl.
CPC ......... *H05B 47/105* (2020.01); *H05B 47/155* (2020.01); *F21W 2131/103* (2013.01)

(58) Field of Classification Search
USPC ....................................................... 340/573.1
See application file for complete search history.

(56) References Cited

U.S. PATENT DOCUMENTS

| 2014/0111098 | A1* | 4/2014 | Amarin | .................. H05B 47/22 |
| | | | | 315/152 |
| 2016/0286629 | A1* | 9/2016 | Chen | ....................... F21V 5/045 |
| 2017/0042003 | A1* | 2/2017 | Logvinov | .............. H05B 47/19 |

FOREIGN PATENT DOCUMENTS

| KR | 20-0258569 Y1 | 12/2001 |
| KR | 10-2009-0065112 A | 6/2009 |
| KR | 10-2011-0094549 A | 8/2011 |
| KR | 10-2013-0093385 A | 8/2013 |

* cited by examiner

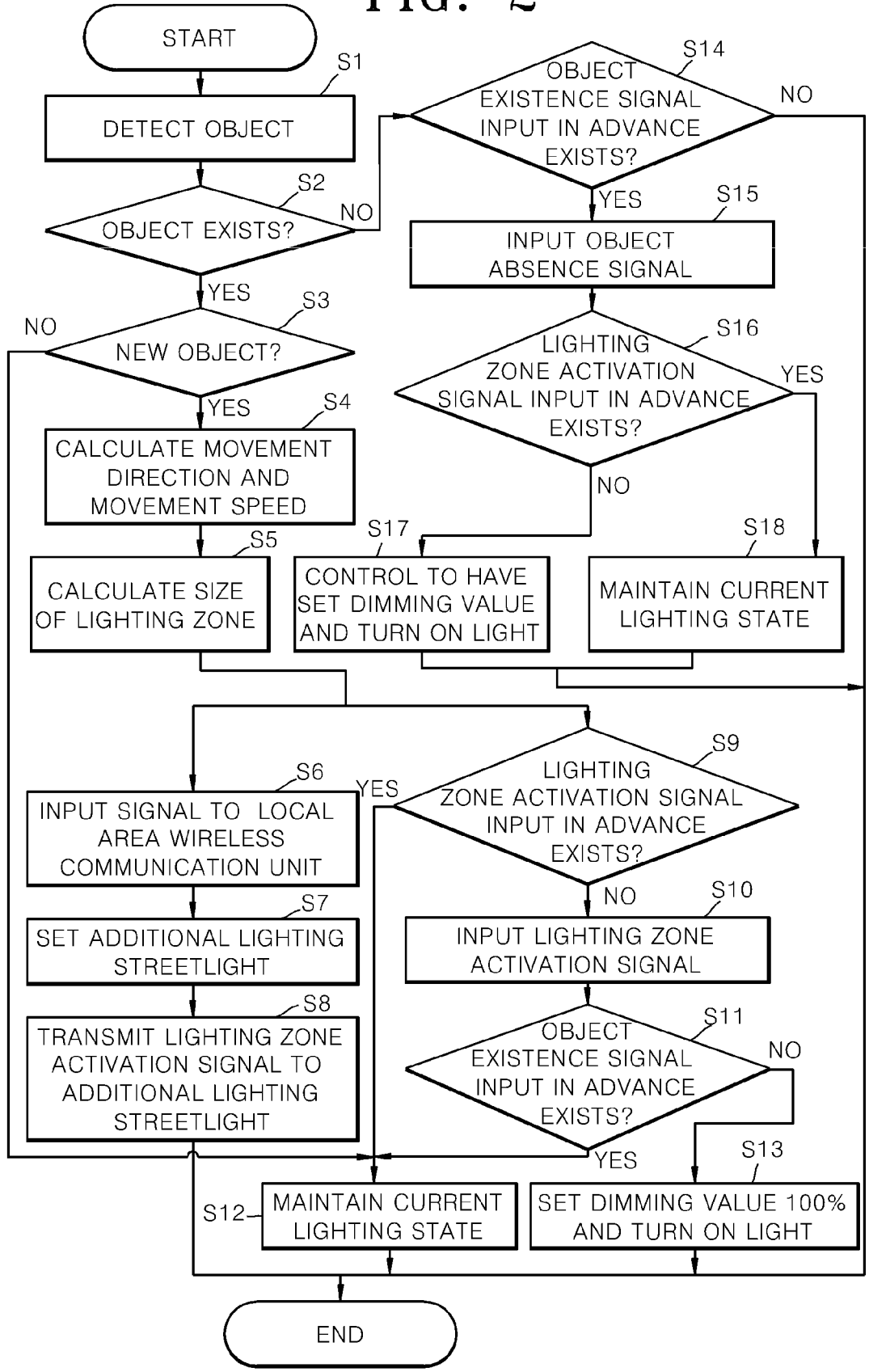

METHOD FOR CONTROLLING STREETLIGHT, AND CONTROL APPARATUS USING SAME

TECHNICAL FIELD

The present invention relates to a method for controlling a streetlight and a control apparatus using the same, and more particularly, to a method for controlling a streetlight, whereby the brightness of a plurality of streetlights installed on a road can be more promptly and efficiently controlled, and a control apparatus using the same.

BACKGROUND ART

In general, a plurality of streetlights as lighting for lighting a road for pedestrian and traffic safety are installed at positions where they are spaced apart from one another by a predetermined distance. In particular, the plurality of streetlights light the road during night pass so that safety driving can be made.

However, in road lighting systems according to the related art, the plurality of streetlights are always turned on or off at one time with the same brightness regardless of the existence of cars or pedestrians. Thus, a considerable amount of power is required for streetlights and thus, there are problems of waste of energy and cost increase.

DETAILED DESCRIPTION OF THE INVENTION

Technical Problem

The present invention provides a method for controlling a streetlight, whereby the streetlight can be more promptly and efficiently controlled, and a control apparatus using the same.

Technical Solution

According to an aspect of the present invention, there is provided a method for controlling a streetlight, including detecting an existence of an object in a preset detection area by using a motion detect sensor installed in one first node streetlight among a plurality of node streetlights and transmitting a detected object existence signal to a signal processor, determining whether the object is a new object that approaches the detection area newly or an existing object that has been detected, when the signal processor receives the object existence signal, calculating a size of a lighting zone based on the first node streetlight by using the signal processor when it is determined that the object is the new object in the object-determining, inputting the object existence signal and a lighting zone activation signal to a lighting controller installed in the first node streetlight by using the signal processor and inputting a signal regarding the size of the lighting zone to a local area wireless communication unit installed in the first node streetlight, setting at least one or more streetlights included in the lighting zone among the plurality of node streetlights adjacent to the first node streetlight as an additional lighting streetlight and transmitting the lighting zone activation signal to the additional lighting streetlight when the local area wireless communication unit receives the signal regarding the size of the lighting zone, and controlling a dimming value of the first node streetlight according to the object existence signal and the lighting zone activation signal so as to turn on light the first node streetlight when a lighting controller of the first node streetlight receives the object existence signal and the lighting zone activation signal in the signal-inputting and controlling a dimming value of the additional lighting streetlight according to the lighting zone activation signal so as to turn on light the additional lighting streetlight when a lighting controller of the additional lighting streetlight receives the lighting zone activation signal in the communicating.

According to another aspect of the present invention, there is provided a control apparatus for a streetlight, including a signal processor determining an existence of an object according to a signal received from a motion detect sensor, and when it is determined that the object exists, determining whether a previously input object existence signal exists, and when the previously input object existence signal does not exist, generating an object existence signal newly, and when it is determined that the object does not exist and the previously input object existence signal does not exist, generating an object absence signal, and when it is determined that the object exists, determining whether the object is a new object or an existing object, and when it is determined that the object is the new object, calculating a size of a lighting zone, a lighting controller turning on light with a preset dimming value when receiving the object existence signal from the signal processor, and when the object absence signal is received from the signal processor and a lighting zone activation signal is received from one among peripheral streetlights, turning on light with a preset dimming value, and a local area wireless communication unit setting at least one more streetlights included in the lighting zone among the peripheral streetlights as an additional lighting streetlight according to the size of the lighting zone and transmitting the lighting zone activation signal to the additional lighting streetlight.

Effects of the Invention

In a method for controlling a streetlight according to the present invention, each of a plurality of node streetlights detects the existence of an object and transmits and receives a signal to/from other streetlights through local area wireless communication, whereby a dimming value of each streetlight is controlled according to an object existence signal and a lighting zone activation signal. Thus, lighting of streetlights can to be more promptly and efficiently controlled.

Furthermore, even when the object does not exist in a detection area of one of the streetlights and the object existence signal does not exist, a dimming value of each node streetlight is controlled according to a previously input lighting zone activation signal so that the front area of an object can be safely turned on light before the object approaches.

Furthermore, a node streetlight that detects the object transmits a live lighting zone activation signal to a live lighting streetlight that needs to be immediately lit, and also transmits a pseudo lighting zone activation signal in advance to a pseudo lighting streetlight disposed subsequent to the live lighting streetlight in order to control the pseudo lighting streetlight to be automatically turned on light after a set time, whereby node streetlights disposed in the forward direction can be normally turned on light although an abnormal problem occurs later on, for example, when a motion detect sensor does not detect the object or communication problem occurs.

DESCRIPTION OF THE DRAWINGS

FIG. 2 is a view illustrating a method for controlling lighting of a streetlight according to a first embodiment of the present invention.

MODE OF THE INVENTION

Hereinafter, exemplary embodiments of the present invention will be described with reference to the accompanying drawings.

Figure 1:
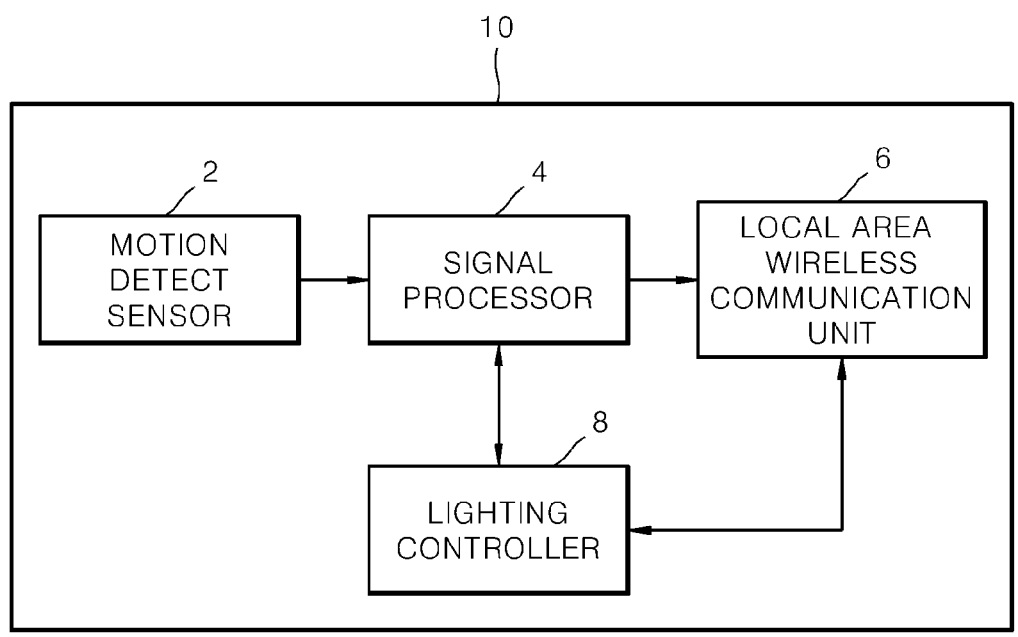
FIG. 1 is a block diagram illustrating an apparatus for controlling lighting of a streetlight according to a first embodiment of the present invention.

FIG. 1 is a block diagram illustrating an apparatus for controlling lighting of a streetlight according to a first embodiment of the present invention.

In the first embodiment of the present invention, an example in which a plurality of streetlights are installed on a road, will be described. The plurality of streetlights, which are installed on the road on which a car drives and are spaced apart from one another by a predetermined distance, will be referred to as node streetlights 20, respectively.

Referring to FIG. 1, an apparatus 10 for controlling lighting of a streetlight according to the first embodiment of the present invention is installed in each of the plurality of streetlights 20 installed on the road, and each node streetlight has the same elements.

Hereinafter, in the present embodiment, an apparats for controlling lighting of one among the plurality of node streetlights 20 will be described as an example. However, the apparatus 10 for controlling lighting of the streetlight is applied to all kinds of apparatuses for controlling lighting, which are installed in the plurality of node streetlights 20.

The apparatus 10 for controlling lighting of the streetlight includes a motion detect sensor 2, a signal processor 4, a local area wireless communication unit 6, and a lighting controller 8.

The motion detect sensor 2 detects the existence of an object in a detection area set in the node streetlight. The detection area is differently set in each of the plurality of node streetlights 20. An example in which a Doppler radar sensor having an ultra wide band (UWB) manner is used as the motion detect sensor 2, will be described. The object includes all of moving objects, such as cars, bicycles, motorcycles, and pedestrians, and hereinafter, in the present embodiment, an example in which the object is a car, will be described. The motion detect sensor 2 may detect the existence of a car in the detection area, approaching of the car to the detection area, and the existence of a traffic jam in the detection area. The motion detect sensor 2 detects coordinate values of the object and transmits an object existence signal to the signal processor 4.

The signal processor 4 receives the object existence signal from the motion detect sensor 2. An example in which the signal processor 4 is installed in each of the plurality of node streetlights, will be described, but, the signal processor 4 may be one central server unit that receives a signal from the plurality of node streetlights.

The signal processor 4 calculates a movement speed and a movement direction of the object according to the object existence signal received from the motion detect sensor 2. Also, the signal processor 4 determines whether the object is a new object that approaches the detection area newly, or an existing object that has been already detected, according to the object existence signal. Also, the signal processor 4 calculates the size of a lighting zone based on the node streetlight according to the movement speed and the movement direction. The signal processor 4 outputs the movement speed of the object, the movement direction, the existence of a new object, the existence of an existing object, the size of a lighting zone LZ, the object existence signal, and the lighting zone activation signal.

The local area wireless communication unit 6 is a device that makes adjacent node streetlights to do local area wireless communication with one another. The local area wireless communication unit 6 receives a signal regarding the movement direction of the object and the size of the lighting zone LZ from the signal processor 4. The local area wireless communication unit 6 sets an additional lighting streetlight that is adjacent to the node streetlight among the plurality of node streetlights 20, does communication while being included in the lighting zone LZ and needs to be lit together. The local area wireless communication unit 6 outputs the size of the lighting zone LZ and the lighting zone activation signal to the additional lighting streetlight. The local area wireless communication unit 6 communicates with a local area wireless communication unit installed in each of the plurality of node streetlights adjacent to the node streetlight. The local area wireless communication unit 6 does radio frequency (RF) communication or Zigbee communication. The plurality of node streetlights are installed on the road continuously at predetermined intervals at a distance of maximum 2 km, and the RF communication can be made within the range of the distance of maximum 10 km and thus is suitable for communication between the node streetlights. Also, the plurality of node streetlights are installed on the road to be spaced apart from one another at intervals of maximum 50 m or less, and the Zigbee communication can be made within the range of the distance of maximum 100 m and thus is suitable for communication between the node streetlights. However, embodiments of the present invention are not limited thereto, and a variety of communications including Z-Wave in addition to Zigbee communication may be used.

The lighting controller 8 receives a signal from the signal processor 4 or the local area wireless communication unit 6. The lighting controller 8 receives the object existence signal and the lighting zone activation signal from the signal processor 4 and receives the lighting zone activation signal from the local area wireless communication unit 6. The lighting controller 8 controls a dimming value of the node streetlight according to the received signal so as to light the node streetlight.

A method for controlling lighting of a streetlight according to a first embodiment of the present invention having the above configuration will be described as below.

FIG. 2 is a view illustrating a method for controlling lighting of a streetlight according to a first embodiment of the present invention.

Referring to FIG. 2, a first node streetlight 21 among the plurality of node streetlights 20 will be described. That is, an example in which the motion detect sensor 2 of the first node streetlight 21 detects an object, will be described.

First, the motion detect sensor 2 performs an object-detecting operation of detecting the existence of an object in a previously set detection area. The motion detect sensor 2 transmits the detected object existence signal to the signal processor 4 (S1). The object existence signal includes coordinate values of the object that exists in the detection area.

The signal processor 4 receives the object existence signal from the motion detect sensor 2. The signal processor 4 determines that the object exists in the detection area, if the object existence signal is received from the motion detect sensor 2 (S2).

The signal processor 4 performs an object-determining operation of determining whether the object is a new object that approaches the detection area newly or an existing object that has been already detected (S3).

Discrimination of the new object and the existing object may be determined according to coordinate values included in the object existence signal, the number of the coordinate values, and the existence of continuity according to the movement path of the object.

The previously stored coordinate values and new coordinate values included in the object existence signal are compared with each other, and the existence of continuity according to the movement path of the object is determined, and if there is continuity of the object, it may be determined that the object is an existing object, and if there is no continuity of the object, it may be determined that the object is a new object. An example in which the previously stored coordinate values are temporarily stored in a database (not shown) included in the apparatus 10 for controlling lighting, will be described. However, embodiments of the present invention are not limited thereto, and the previously stored coordinate values may be temporarily stored in the signal processor 4 or the lighting controller 8 except for the database.

Meanwhile, if the number of the coordinate values included in the object existence signal is greater than the number of the previously stored coordinate values, it may be determined that the object is a new object.

If it is determined that the object is not a new object but an existing object, the current lighting state of the first node streetlight 21 is maintained (S12).

If it is determined that the object is the new object, the signal processor 4 calculates the movement direction and the movement speed of the new object (S4).

The movement speed may be calculated using a difference between the coordinate values included in the object existence signal and time at which the motion detect sensor 2 detects the coordinate values. When there are several new objects, an average value of movement speeds of the all detected objects may be calculated as the movement speed, or a largest value may be calculated as the movement speed.

The signal processor 4 performs a calculating operation of calculating the size of a lighting zone that needs to be lit based on the first node streetlight 21 according to the movement speed (S5).

The size of the lighting zone includes the number of streetlights that need to be lit. The number of streetlights that need to be lit, may be calculated using the movement speed and a distance between the plurality of node streetlights 20. The size of the lighting zone is set in proportion to the movement speed. For example, if the movement speed of the new object is fast, the number of adjacent streetlights that need to be lit in the front area of the first node streetlight 21 may be increased, and if the movement speed of the new object is slow, the number of adjacent streetlights that need to be lit in the front area of the first node streetlight 21 may be decreased.

After the calculating operation is performed, the signal processor 4 inputs a signal regarding the movement direction of the new object and the size of the lighting zone to the local area wireless communication unit 6 (S6).

Figure 3A:
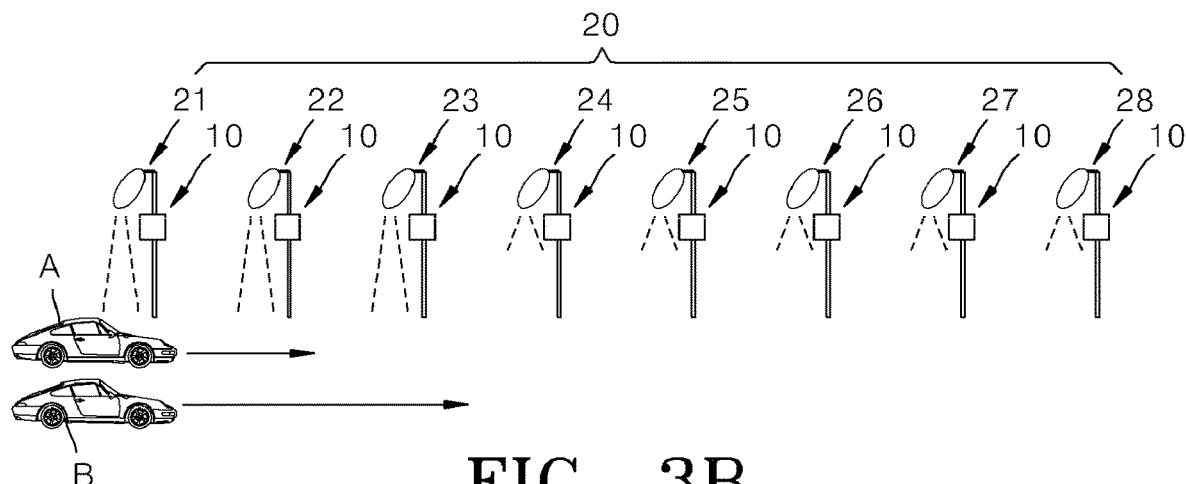
FIGS. 3A, 3B and 3C are views illustrating a state in which controlling of lighting of a streetlight according to the first embodiment of the present invention is implemented.

When receiving the signal regarding the movement direction of the new object and the size of the lighting zone, the local area wireless communication unit 6 sets at least one or more streetlights included in the lighting zone among the plurality of streetlights 20 adjacent to the first node streetlight 21 as an additional lighting streetlight (S7). Referring to FIG. 3A that will be described later, an example in which two additional lighting streetlights are set, will be described. The number of additional lighting streetlights is differently set according to the movement direction and the movement speed. That is, adjacent streetlights except for the first node streetlight 21 that detects the object are set as additional lighting streetlights and are controlled so that the additional lighting streetlights in addition to the first node streetlight 21 that detects the object can be turned on light together.

The local area wireless communication unit 6 transmits a lighting zone activation signal to the additional lighting streetlights (S8). The lighting zone activation signal is a control signal that makes a corresponding streetlight to be included in the lighting zone and to be lit. The local area wireless communication unit 6 communicates with each of the local area wireless communication units installed in the additional lighting streetlights and transmit the lighting zone activation signal.

When transmitting the lighting zone activation signal, each local area wireless communication unit installed in the additional lighting streetlights transmits a signal to a lighting controller of each of the additional lighting streetlights. When receiving the lighting zone activation signal, the lighting controller of each additional lighting streetlight controls a dimming value of each additional lighting streetlight differently according to the existence of a previously input object existence signal.

That is, when a previously input object existence signal does not exist, the lighting controller of the additional lighting streetlight determines that the additional lighting streetlight is not turned on light or turned on light with a set dimming value, the dimming value of the additional lighting streetlight is set as a rated value or more, and the additional lighting streetlight is turned on light. An example in which the set dimming value is in the range of 30 to 50% and the rated value is 100%, will be described. However, embodiments of the present invention are not limited thereto, and the set dimming value and the rated value may be set in various ways according to various factors such as a manager's choice or peripheral environment.

When a previously input object existence signal exists, the lighting controller of the additional lighting streetlight may determine that the additional lighting streetlight is turned on light due to the dimming value of the additional lighting streetlight set as the rated value or more, and the additional lighting streetlight may be controlled to be maintained in a current lighting state.

Meanwhile, after the calculation operation is performed, the signal processor 4 determines whether the previously input lighting zone activation signal exists (S9). The previously input lighting zone activation signal is a signal that has been temporarily stored in the database.

When the previously input lighting zone activation signal exists, it may be determined that the first node streetlight 21 is turned on light due to the dimming value of the first node streetlight 21 set as 100% that is the rated value, and the first node streetlight 21 may be controlled to be maintained in the current lighting state (S12).

When the previously input lighting zone activation signal does not exist, the signal processor 4 inputs the object existence signal and the lighting zone activation signal to the lighting controller 8 (S10).

Also, the signal processor 4 may store the lighting zone activation signal to the database temporarily.

When the lighting zone activation signal is input to the lighting controller 8, the lighting controller 8 determines whether a previously input object existence signal exists (S11). The previously input object existence signal is a signal that has been temporarily stored in the database.

When the previously input object existence signal exists, it is determined that the first node streetlight 21 has been already turned on light due to the dimming value of the first node streetlight 21 set as 100% that is the rated value, and the first node streetlight 21 is controlled to be maintained in a current lighting state (S12).

When the previously input lighting zone activation signal does not exist, it is determined that the first node streetlight 21 is not turned on light or turned on light with a set dimming value, and the dimming value is set up as 100% that is the rated value, and the first node streetlight 21 is turned on light (S13).

Also, the signal processor 4 may store the object existence signal in the database temporarily.

Meanwhile, when, in the object-detecting operation (S1), the object existence signal is not transmitted from the motion detect sensor 2 to the signal processor 4, the signal processor 4 determines whether a previously input object existence signal exists (S14).

That is, when a newly received object existence signal does not exist, the signal processor 4 checks whether the previously input object existence signal. The previously input object existence signal is a signal that has been temporarily stored in the database.

When the previously input object existence signal does not exist, the current lighting state of the first node streetlight 21 is maintained, or execution is terminated. When the previously input object existence signal does not exist, the current lighting state is a state in which the first node streetlight 21 is not turned on light, or a state in which the first node streetlight 21 is turned on light with the set dimming value in the range of 30 to 50%.

That is, when the previously input object existence signal exists, the signal processor 4 inputs an object absence signal to the lighting controller 8 newly (S15).

When the object absence signal is newly input, the lighting controller 8 determines whether the previously input lighting zone activation signal exists (S16).

When a previously input lighting zone activation signal does not exist, the lighting controller 8 controls the first node streetlight 21 to have the set dimming value 30 to 50% and turns on light the first node streetlight 21 (S17). That is, even when the object is not detected, for safety, the first node streetlight 21 is turned on light with the dimming value 30 to 50%. Meanwhile, when the object existence signal does not exist and the previously input lighting zone activation signal does not exist, of course, the dimming value of the first node streetlight 21 may be controlled according to weather information or time information. The weather information or the time information may be periodically received from an external institution. For example, even when the object is not detected when it is foggy or cloudy or in a dark time after sunset, for safety, the first node streetlight 21 may be turned on light with the dimming value 30 to 50%.

When the previously input lighting zone activation signal exists, the lighting controller 8 maintains the current lighting state of the first node streetlight 21 (S18). When the previously input lighting zone activation signal exists, it may be determined that the first node streetlight 21 is turned on light, and thus, the current lighting state is maintained.

Meanwhile, in the above embodiment, an example in which the size of the lighting zone is calculated according to the movement direction and speed of the new object, has been described. However, embodiments of the present invention are not limited thereto, and of course, the size of the lighting zone may be input by a user in advance by using a manual or semi-automatic method and may be stored.

The manual method is a method, whereby the user manually inputs the number of streetlights that need to be lit, as the size of a lighting zone during initialization of a system. The semi-automatic method is a method, whereby a plurality of lighting modes are previously set in the system and when the user selects one among the plurality of lighting modes during initialization, the number of streetlights that need to be lit, is set as the size of the lighting zone according to the selected mode. That is, in the semi-automatic method, the user selects a lighting mode without inputting the number of streetlights to be lit. For example, the plurality of lighting modes may include a power saving mode, a general mode, and a safety mode, and in the power saving mode, the number of streetlights to be lit is set as the smallest in advance, and in the safety mode, the number of streetlights to be lit is set as the largest in advance, and the user selects one among the lighting modes without the need of directly inputting the number of streetlights.

FIG. 3 is a view illustrating a state in which controlling of lighting of a streetlight according to the first embodiment of the present invention is implemented.

Referring to FIG. 3, node streetlights installed at a side at which the car approaches, among the plurality of node streetlights 20 installed on a road, will be referred to as first, second, third, fourth, fifth, sixth, seventh, and eighth node streetlights 21 to 28. The lighting controller 10 is provided in each of the first through eighth node streetlights 21 to 28.

Referring to FIG. 3A, two cars, first and second cars A and B approach a detection area of the first node streetlight 21. When the first and second cars A and B approach, all of the object existence signal and the lighting zone activation signal are input to the lighting controller 8 of the first node streetlight 21. Thus, the dimming value of the first node streetlight 21 is set as 100% that is the rated value, and the first node streetlight 21 is turned on light.

The local area wireless communication unit 6 of the first node streetlight 21 sets the second and third node streetlights 22 and 23 that are adjacent to the first node streetlight 21 as the additional lighting streetlight. The local area wireless communication unit 6 of the first node streetlight 21 transmits a lighting zone activation signal to each local area wireless communication unit of the second and third node streetlights 22 and 23 via wireless communication. The second and third node streetlights 22 and 23 controls the dimming value differently according to the existence of the previously input object existence signal when receiving the lighting zone activation signal.

That is, when the previously input object existence signal exists in a state in which the second and third node streetlights 22 and 23 receive the lighting zone activation signal, the second and third node streetlights 22 and 23 determine that they are turned on light due to the dimming value set as 100% that is the rated value, and are maintained in the current lighting state.

The second and third node streetlights 22 and 23 receive the lighting zone activation signal, and when the previously input object existence signal does not exist, it is determined that the second and third node streetlights 22 and 23 are not turned on light or turned on light with the set dimming value, and the dimming value is set up as 100% that is the rated value, and the second and third node streetlights 22 and 23 are turned on light.

Thus, as shown in FIG. 3A, when the first and second cars A and B approach the first node streetlight 21, the dimming values of the first node streetlight 21 and the second and third node streetlights 22 and 23 are set as 100% that is the rated value, and all of the first node streetlight 21 and the second and third node streetlights 22 and 23 are turned on light.

Figure 3B:
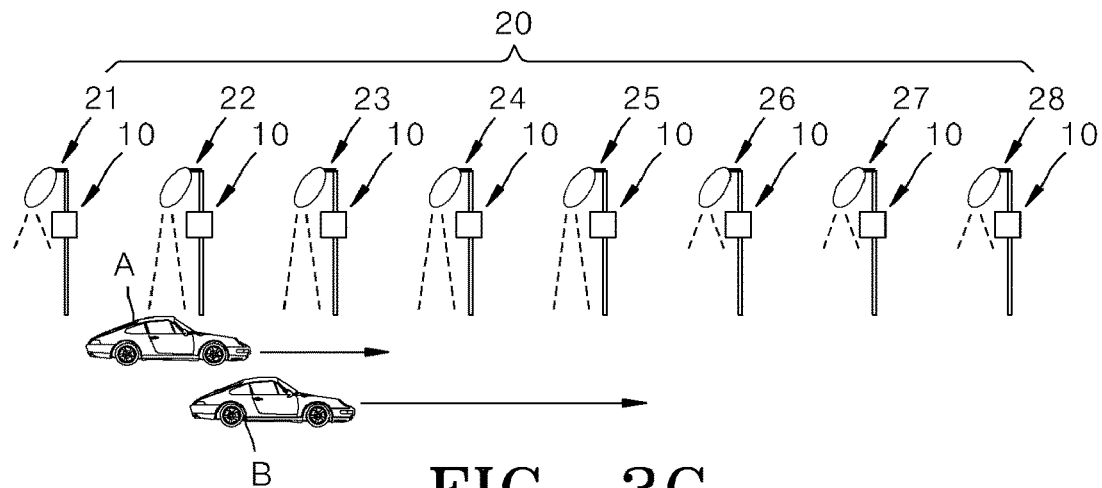

Meanwhile, referring to FIG. 3B, the first car A and the second car B are moved by a predetermined distance.

An example in which the moving speeds of the first car A and the second car B are different from each other, will be described.

When the first car A approaches the detection area of the second node streetlight 22, the object existence signal and the lighting zone activation signal are input to the lighting controller 8 of the second node streetlight 22. Thus, the dimming value of the second node streetlight 22 is set as 100% that is the rated value, and the second node streetlight 22 is turned on light.

Because no object is detected in the first node streetlight 21, even when a previously input object existence signal exists, an object absence signal is newly input to the first node streetlight 21.

Also, because no lighting zone activation signal exists in the first node streetlight 21, the first node streetlight 21 is set down as 30 to 50% that is the set dimming value and is turned on light.

The local area wireless communication unit 6 of the second node streetlight 22 sets third and fourth node streetlights 23 and 24 that are adjacent to the second node streetlight 22, as the additional lighting streetlight. The local area wireless communication unit 6 of the second node streetlight 22 transmits a lighting zone activation signal to each local area wireless communication unit of the third and fourth node streetlights 23 and 24 via wireless communication. The third and fourth node streetlights 23 and 24 control dimming values differently according to the existence of the previously input object existence signal when receiving the lighting zone activation signal. That is, when the previously input object existence signal exists in a state in which the third and fourth node streetlights 23 and 24 receive the lighting zone activation signal, it is determined that the third and fourth node streetlights 23 and 24 are turned on light with the dimming value 100% that is the rated value, and the third and fourth node streetlights 23 and 24 are maintained in the current lighting state.

Because an object existence signal due to the second car B exists, the dimming value of the third node streetlight 23 is set as 100% that is the rated value, and the third node streetlight 23 is maintained to be turned on light.

Because a previously input object existence signal does not exist in a state in which the fourth node streetlight 24 receives the lighting zone activation signal, it is determined that the fourth node streetlight 24 is not turned on light or turned on light with the set dimming value, and the dimming value of the fourth node streetlight 24 is set up as 100% that is the rated value, and the fourth node streetlight 24 is turned on light.

Thus, when the first car A approaches the second node streetlight 22, the dimming values of the second node streetlight 22 and the third and fourth node streetlights 23 and 24 are set as 100% that is the rated value, and all of the second node streetlight 22 and the third and fourth node streetlights 23 and 24 are turned on light.

Meanwhile, because the second car B approaches the detection area of the third node streetlight 23, all of the object existence signal and the lighting zone activation signal are input to the lighting controller 8 of the third node streetlight 23. Thus, the dimming value of the third node streetlight 23 is set as 100% that is the rated value, and the third node streetlight 23 is turned on light.

The local area wireless communication unit 6 of the third node streetlight 23 sets the fourth and fifth node streetlights 24 and 25 that are adjacent to the third node streetlight 23, as the additional lighting streetlight. The local area wireless communication unit 6 of the third node streetlight 23 transmits a lighting zone activation signal to each local area wireless communication unit of the fourth and fifth node streetlights 24 and 25 via wireless communication. When receiving the lighting zone activation signal, the fourth and fifth node streetlights 24 and 25 control the dimming values differently according to the existence of the previously input object existence signal.

When the previously input object existence signal exists in a state in which the fourth and fifth node streetlights 24 and 25 receive the lighting zone activation signal, it is determined that the fourth and fifth node streetlights 24 and 25 are turned on light with the dimming value set as 100% that is the rated value, and the fourth and fifth node streetlights 24 and 25 are maintained in the current lighting state.

Because the previously input object existence signal does not exist in a state in which the fourth node streetlight 24 receives the lighting zone activation signal, it is determined that the fourth node streetlight 24 is not turned on light or turned on light with the set dimming value, and the dimming value of the fourth node streetlight 24 is set up as 100% that is the rated value, and the fourth node streetlight 24 is turned on light.

Because the previously input object existence signal does not exist in a state in which the fifth node streetlight 25 receives the lighting zone activation signal, it is determined that the fifth node streetlight 25 is not turned on light or turned on light with the set dimming value, and the dimming value of the fifth node streetlight 25 is set up as 100% that is the rated value, and the fifth node streetlight 25 is turned on light.

Thus, as shown in FIG. 3B, when the first car A approaches the detection area of the second node streetlight 22 and the second car B approaches the detection area of the third node streetlight 23, the dimming values of the second, third, fourth, and fifth node streetlights 22, 23, 24, and 25 are set as 100% that is the rated value, and all of the second, third, fourth, and fifth node streetlights 22, 23, 24, and 25 are turned on light.

Figure 3C:
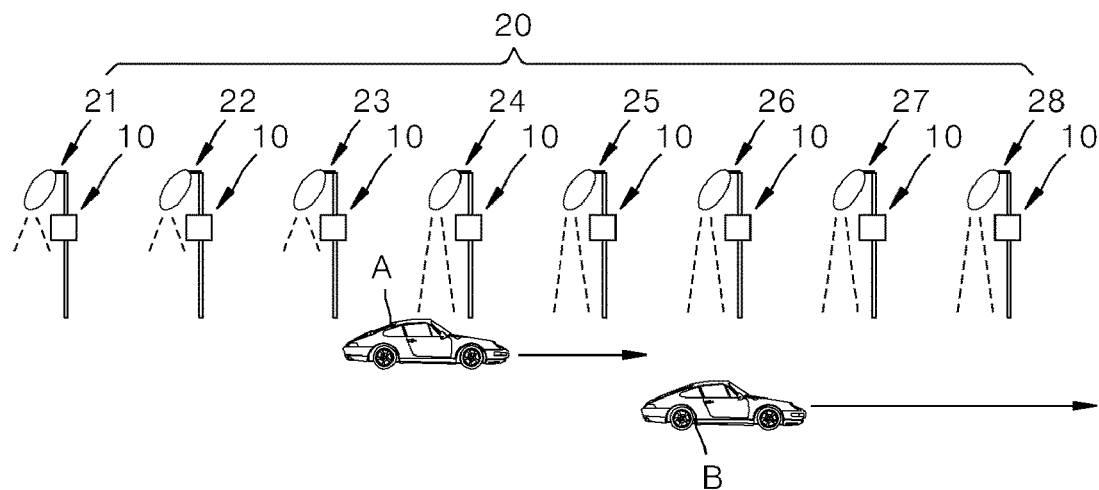

Meanwhile, referring to FIG. 3C, the first car A and the second car B are further moved by a predetermined distance.

When the first car A approaches the detection area of the fourth node streetlight 24, the object existence signal and the lighting zone activation signal are input to the lighting controller 8 of the fourth node streetlight 24. Thus, the dimming value of the fourth node streetlight 24 is set as 100% that is the rated value, and the fourth node streetlight 24 is turned on light.

Because no object is detected in the first, second, and third node streetlights 21, 22, and 23, even when the previously input object existence signal exists, an object absence signal is newly input. Also, because the lighting zone activation signal does not exist in the first, second, and third node streetlights 21, 22, and 23, the first, second, and third node streetlights 21, 22, and 23 are set down as 30 to 50% that is the set dimming value and are turned on light.

The local area wireless communication unit 6 of the fourth node streetlight 24 sets the fifth and sixth node streetlights 25 and 26 that are adjacent to the fourth node streetlight 24, as the additional lighting streetlight. The local area wireless communication unit 6 of the fourth node streetlight 24 transmits a lighting zone activation signal to each local area wireless communication unit of the fifth and sixth node streetlights 25 and 26 via wireless communication. When receiving the lighting zone activation signal, the fifth and sixth node streetlights 25 and 26 control the dimming values differently according to the existence of the previously input object existence signal.

When the previously input object existence signal exists in a state in which the fifth and sixth node streetlights 25 and 26 receive the lighting zone activation signal, it is determined that the fifth and sixth node streetlights 25 and 26 are turned on light due to the set dimming value 100% that is the rated value, and the fifth and sixth node streetlights 25 and 26 are maintained in the current lighting state.

Because the previously input object existence signal does not exist in a state in which the fifth node streetlight 25 receives the lighting zone activation signal, it is determined that the fifth node streetlight 25 is not turned on light or turned on light with the set dimming value, and the dimming value of the fifth node streetlight 25 is set up as 100% that is the rated value, and the fifth node streetlight 25 is turned on light.

Because the previously input object existence signal does not exist in a state in which the sixth node streetlight 26 receives the lighting zone activation signal, it is determined that the sixth node streetlight 26 is not turned on light or turned on light with the set dimming value, and the dimming value of the sixth node streetlight 26 is set up as 100% that is the rated value, and the sixth node streetlight 26 is turned on light.

Meanwhile, because the second car B approaches the detection area of the sixth node streetlight 26, the object existence signal and the lighting zone activation signal are input to the lighting controller 8 of the sixth node streetlight 26. Thus, the dimming value of the sixth node streetlight 26 is set as 100% that is the rated value, and the sixth node streetlight 26 is turned on light.

The local area wireless communication unit 6 of the sixth node streetlight 26 sets the seventh and eighth node streetlights 27 and 28 that are adjacent to the sixth node streetlight 26, as the additional lighting streetlight. The local area wireless communication unit 6 of the sixth node streetlight 26 transmits a lighting zone activation signal to each local area wireless communication unit of the sixth and eighth node streetlights 27 and 28 via wireless communication. The seventh and eighth node streetlights 27 and 28 control the dimming values differently according to the existence of the previously input object existence signal when receiving the lighting zone activation signal.

When the previously input object existence signal exists in a state in which the seventh and eighth node streetlights 27 and 28 receive the lighting zone activation signal, it is determined that the seventh and eighth node streetlights 27 and 28 are turned on light with the set dimming value 100% that is the rated value, and the seventh and eighth node streetlights 27 and 28 are maintained in the current lighting state.

Because the previously input object existence signal does not exist in a state in which the seventh node streetlight 27 receives the lighting zone activation signal, it is determined that the seventh node streetlight 27 is not turned on light or turned on light with the set dimming value, and the dimming value of the seventh node streetlight 27 is set up as 100% that is the rated value, and the seventh node streetlight 27 is turned on light.

Because the previously input object existence signal does not exist in a state in which the eighth node streetlight 28 receives the lighting zone activation signal, it is determined that the eighth node streetlight 28 is not turned on light or turned on light with the set dimming value, and the dimming value of the eighth node streetlight 28 is set up as 100% that is the rated value, and the eighth node streetlight 28 is turned on light.

Thus, as shown in FIG. 3C, when the first car A approaches the detection area of the fourth node streetlight 24 and the second car B approaches the detection area of the sixth node streetlight 26, dimming values of the fourth, fifth, sixth, seventh, and eighth node streetlights 24, 25, 26, 27, and 28 are set as 100% that is the rated value, and all of the fourth, fifth, sixth, seventh, and eighth node streetlights 24, 25, 26, 27, and 28 are turned on light.

Figure 4:
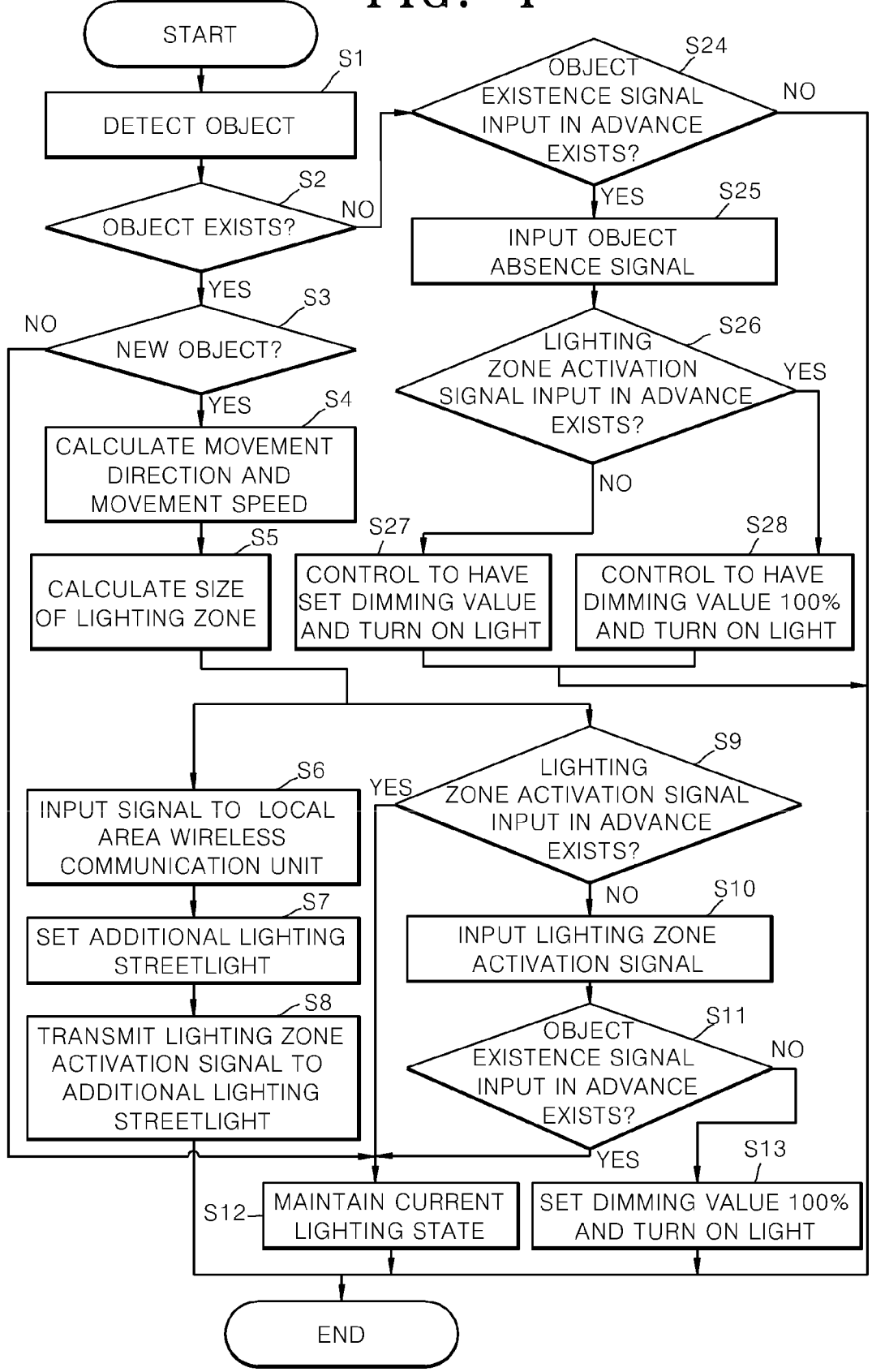
FIG. 4 is a view illustrating a method for controlling lighting of a streetlight according to a second embodiment of the present invention.

FIG. 4 is a view illustrating a method for controlling lighting of a streetlight according to a second embodiment of the present invention.

Referring to FIG. 4, a first node streetlight 21 among the plurality of node streetlights 20 will be described. That is, an example in which the motion detect sensor 2 of the first node streetlight 21 detects an object, will be described.

Referring to FIG. 4, in the method for controlling lighting of the streetlight according to the second embodiment of the present invention, when, in the object-detecting operation (S1), the object existence signal is not transmitted to the signal processor 4 from the motion detect sensor 2, the control method is different from that of the first embodiment, and the other configurations are similar to those of the first embodiment, and thus, the different configuration will be described in detail, and a detailed description of the similar configurations will be omitted.

When, in the object-detecting operation (S1), the object existence signal is not transmitted to the signal processor 4 from the motion detect sensor 2, the signal processor 4 determines whether the previously input object existence signal exists (S24).

When the previously input object existence signal exists, the signal processor 4 inputs an object absence signal to the lighting controller 8 newly (S25).

When the object absence signal is newly input, the lighting controller 8 determines whether the previously input lighting zone activation signal exists (S26).

When the previously input lighting zone activation signal does not exist, the lighting controller 8 controls the first node streetlight 21 to have the set dimming value 30 to 50% and turns on light the first node streetlight 21 (S27). That is, even when no object is detected, for safety, the first node streetlight 21 is turned on light with 30 to 50% dimming value. Meanwhile, when the object existence signal does not exist and previously input lighting zone activation signal, of course, the dimming value of the first node streetlight 21 may be controlled according to weather information or time information. The weather information or time information may be periodically received from an external institution. For example, even when the object is not detected when it is foggy or cloudy or in a dark time after sunset, for safety, the first node streetlight 21 may be turned on light with the dimming value 30 to 50%.

Meanwhile, when the previously input lighting zone activation signal exists, the lighting controller 8 controls the first node streetlight 21 by setting the dimming value of the first node streetlight 21 as 100% that is the rated value (S28). That is, even when the object existence signal does not exist and when the lighting zone activation signal exists, the dimming value of the first node streetlight 21 may be set as 100% that is the rated value, and the first node streetlight 21 may be turned on light.

Figure 5:
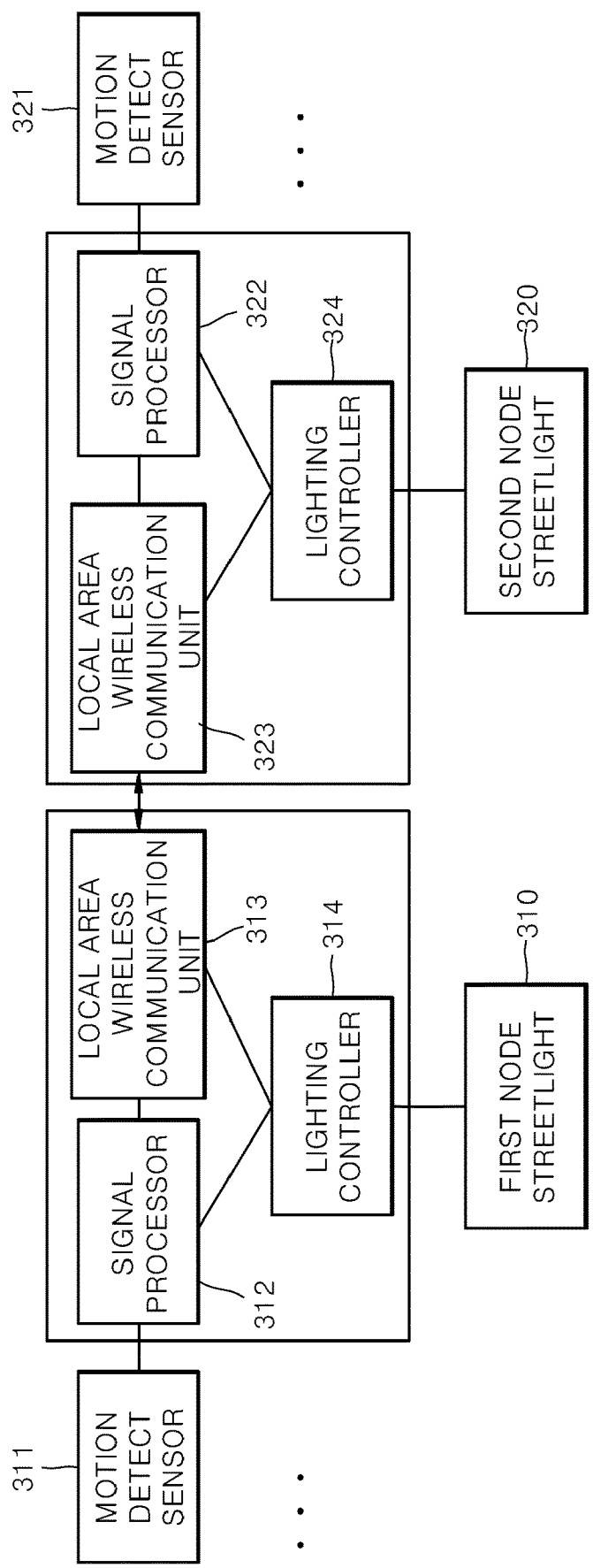
FIG. 5 is a block diagram schematically illustrating a control apparatus for a streetlight according to a third embodiment of the present invention.
Figure 6:
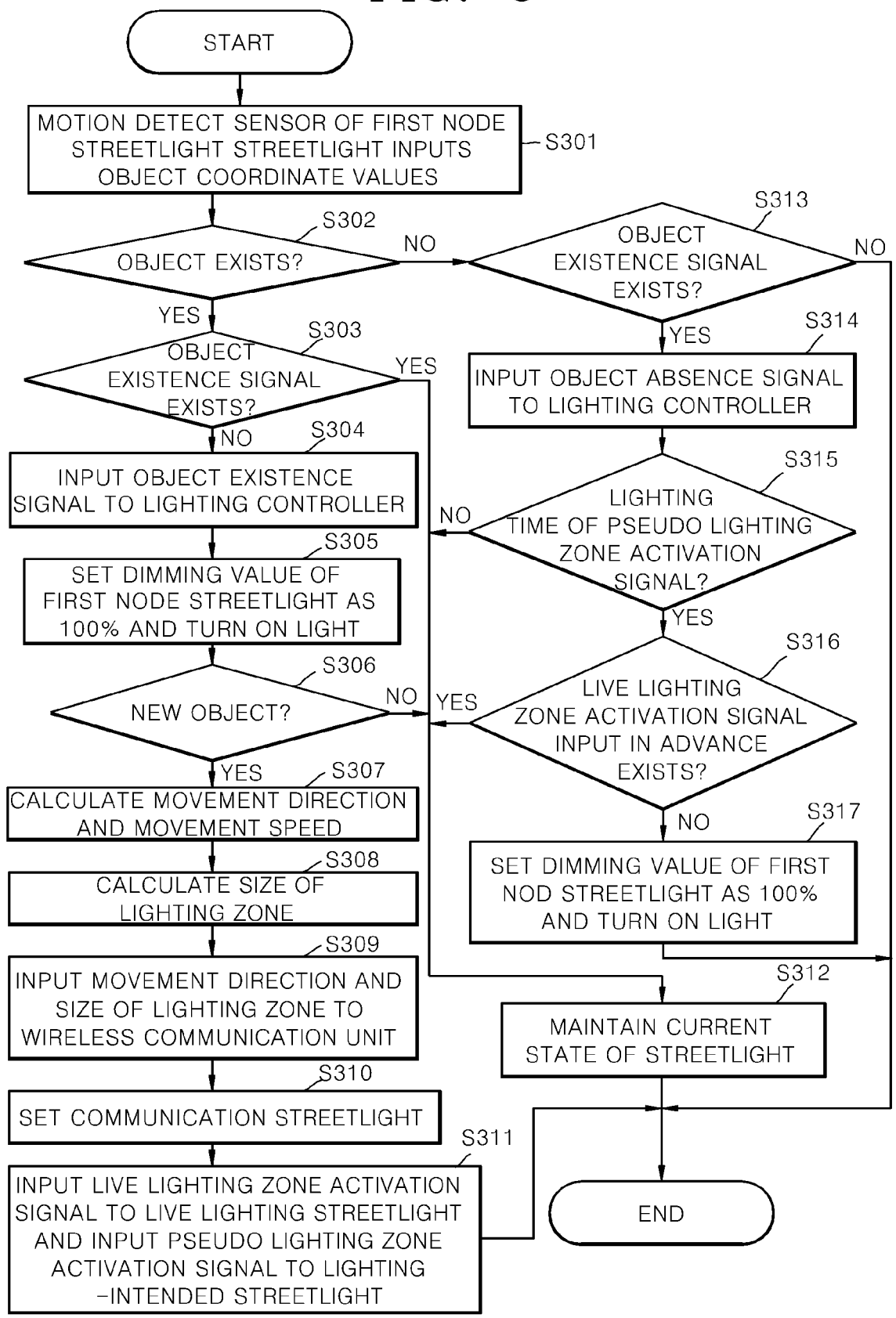
FIG. 6 is a flowchart illustrating a method for controlling a streetlight according to a third embodiment of the present invention.
Figure 7:
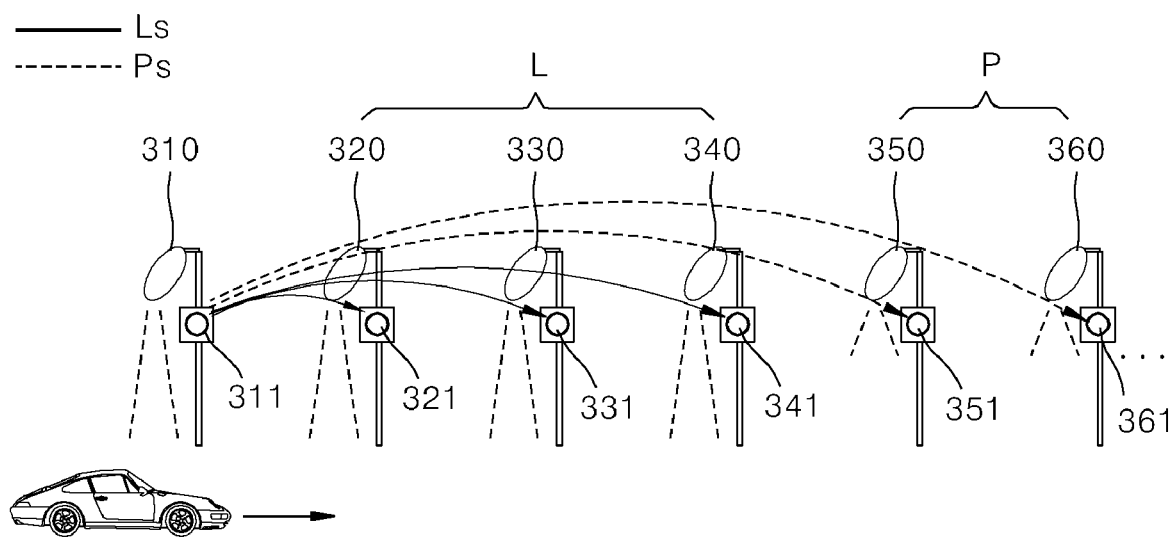
FIG. 7 is view illustrating a state in which controlling of a streetlight according to the third embodiment of the present invention is implemented.

Meanwhile, FIG. 5 is a block diagram schematically illustrating a control apparatus for a streetlight according to a third embodiment of the present invention. FIG. 6 is a flowchart illustrating a method for controlling a streetlight according to a third embodiment of the present invention. FIG. 7 is view illustrating a state in which controlling of a streetlight according to the third embodiment of the present invention is implemented.

Referring to FIGS. 5 through 7, the control apparatus for the streetlight according to the third embodiment of the present invention includes a plurality of node streetlights 310 to 360 installed on a road. A plurality of streetlights installed on the road on which a car drives, to be spaced apart from one another by a predetermined distance will be referred to as node streetlights 310 to 360.

Hereinafter, in the present embodiment, six streetlights, i.e., first, second, third, fourth, fifth, and sixth node streetlights 310, 320, 330, 340, 350, and 360 will be described as an example of the plurality of node streetlights 310 to 360, but embodiments of the present invention are not limited thereto, and the number of the plurality of node streetlights may be diversely set.

Control configurations of the plurality of node streetlights 310 to 360 are all the same. Each of the plurality of node streetlights 310 to 360 includes a motion detect sensor, a wireless communication unit, a signal processor, and a lighting controller. Hereinafter, control elements of the first node streetlight 310 will be described in detail.

The first node streetlight 310 includes a motion detect sensor 311 that detects an object on the road, a signal processor 312 that processes a signal detected by the motion detect sensor 311, a wireless communication unit 313 that communicates with an adjacent streetlight, and a lighting controller 314 that controls lighting of the first node streetlight 310.

In the present embodiment, an example in which motion detect sensors 311, 321, 331, 341, 351, and 361 for detecting an object are provided in the plurality of node streetlights 310 to 360, respectively, will be described.

The motion detect sensor 311 detects the existence of the object in the detection area set in each of the plurality of node streetlights. An example in which a Doppler radar sensor having an UWB manner is used as the motion detect sensor 311, will be described. The object includes all of moving objects, such as cars, bicycles, motorcycles, and pedestrians, and hereinafter, in the present embodiment, an example in which the object is a car, will be described. The motion detect sensor 311 may detect the existence of a car in the detection area, approaching of the car to the detection area, and the existence of a traffic jam in the detection area. The motion detect sensor 311 inputs coordinate values of the object to the signal processor 312. That is, when the motion detect sensor 311 of the first node streetlight 310 detects the object, object coordinate values regarding the position of the object are input to the signal processor 312 of the first node streetlight 310.

The signal processor 312 receives the object coordinate values from the motion detect sensor 311. The signal processor 312 determines the existence of the object according to the object coordinate values and determines whether the object is a new object or an existing object. Also, the signal processor 312 determines whether an object existence signal is activated or not. Also, the signal processor 312 calculates a speed and a movement direction of the new object according to the object coordinate values and calculates the size of a lighting zone according to the calculated speed and movement direction. The signal processor 312 inputs the movement direction of the new object and the size of the lighting zone to the wireless communication unit 313.

The wireless communication unit 313 makes adjacent node streetlights to do local area wireless communication with one another. The wireless communication includes RF communication or Zigbee communication. The plurality of node streetlights are installed on the road continuously at predetermined intervals at a distance of maximum 2 km, and the RF communication can be made within the range of the distance of maximum 10 km and thus is suitable for communication between the node streetlights. Also, the plurality of node streetlights are installed on the road to be spaced apart from one another at intervals of maximum 50 m or less, and the Zigbee communication can be made within the range of the distance of maximum 100 m and thus is suitable for communication between the node streetlights. However, embodiments of the present invention are not limited thereto, and a variety of communications including Z-Wave in addition to Zigbee communication may be used.

The wireless communication unit 313 receives the movement direction of the new object and the size of the lighting zone from the signal processor 312 and sets communication streetlights that need to communicate among the plurality of node streetlights.

The communication streetlights are classified into a live lighting streetlight L and a pseudo lighting streetlight P according to the size of the lighting zone.

The live lighting streetlight L is an additional lighting streetlight that is turned on light with a set dimming value immediately after receiving a live lighting zone activation signal Ls from the wireless communication unit 313. The set dimming value is 100%.

The pseudo lighting streetlight P is a lighting-intended streetlight that receives a pseudo lighting zone activation signal Ps from the wireless communication unit 313 and is intended to be lit with the set dimming value at a preset lighting time from the pseudo lighting zone activation signal. The lighting time is set as a time at which a predetermined time elapses after the live lighting streetlight L is turned on light.

In the present embodiment, an example in which the motion detect sensor 311 of the first node streetlight 310 detects a new object, will be described. Thus, the second, third, and fourth node streetlights 320, 330, and 340 are set as the live lighting streetlight L, and the fifth and sixth node streetlights 350 and 360 are set as the pseudo lighting streetlight P.

The number of the live lighting streetlights L or the number of the pseudo lighting streetlights P is set according to the size of the lighting zone. However, embodiments of the present invention are not limited thereto, and of course, the number of the pseudo lighting streetlights P may be set according to the number of the live lighting streetlights L or a predetermined number.

The lighting controller 314 controls the dimming value of the first node streetlight 310 so as to light the first node streetlight 310. The lighting controller 314 receives the object existence signal, the live lighting zone activation signal Ls, and the pseudo lighting zone activation signal Ps and outputs a dimming value according to the received signals.

The second node streetlight 320 includes a motion detect sensor 321 that detects an object on the road, a signal processor 322 that processes a signal detected by the motion detect sensor 321, a wireless communication unit 323 that communicates with an adjacent streetlight, and a lighting controller 324 that controls lighting of the second node streetlight 320. Also, configurations and operations of the third, fourth, fifth, and sixth node streetlights 330, 340, 350, and 360 are the same and thus, the following detailed description thereof will be omitted.

The method for controlling a streetlight according to the third embodiment of the present invention having the above configuration will be described as below.

Referring to FIG. 6, an example in which the motion detect sensor 311 of the first node streetlight 310 among the plurality of node streetlights 310 to 360 detects the object, will be described.

When detecting the object, the motion detect sensor 311 of the first node streetlight 310 inputs coordinate values of the object to the signal processor 312 of the first node streetlight 310 (S301).

The signal processor 312 of the first node streetlight 310 determines the existence of the object according to the input coordinate values (S302).

When it is determined that the object exists, the signal processor 312 of the first node streetlight 310 determines whether an object existence signal input in advance exists in the first node streetlight 310 (S303).

When it is determined that the object existence signal input in advance exists, the current state of the first node streetlight 310 is maintained (S312). That is, when it is determined that the object existence signal input in advance exists, it is determined that the first node streetlight 310 is turned on light due to the dimming value set as 100%, and the current state of the first node streetlight 310 is maintained.

Meanwhile, when it is determined that the object existence signal input in advance does not exist, the signal processor 312 of the first node streetlight 310 generates an object existence signal regarding the object newly and inputs the object existence signal to the lighting controller 314 of the first node streetlight 310 (S304).

When receiving the object existence signal, the lighting controller 314 of the first node streetlight 310 sets the dimming value of the first node streetlight 310 as 100% so as to light the first node streetlight 310 (S305).

Also, the signal processor 312 of the first node streetlight 310 determines whether the object is a new object or an existing object (S306).

When the number of coordinate values of an object input from the motion detect sensor 311 is larger than the number of previously stored coordinate values of the existing object, it may be determined that the object is a new object. Also, when the number of newly input coordinate values of the input object is equal to or less than the number of previously stored coordinate values of the existing object, continuity of the movement path of the object is determined by referring to the newly input coordinate values of the object and the previously stored coordinate values of the existing object. When it is determined that there is continuity of the movement path of the object, it may be determined that the object is an existing object. When it is determined that there is no continuity of the movement path of the object, it may be determined that the object is a new object. In order to determine continuity of the movement path, coordinate values of the object are stored and managed so that one object has at least two or more coordinate histories.

When it is determined that the object is not the new object, the current state of the first node streetlight 310 is maintained, and execution is terminated (S312).

Meanwhile, when it is determined that the object is the new object, the signal processor 312 of the first node streetlight 310 calculates the speed and movement direction of the new object (S307).

The signal processor 312 of the first node streetlight 310 calculates the speed of the new object by using a distance difference between the coordinate values according to the time of the new object and a predetermined period time measured by the motion detect sensor 314. Also, when the number of the new object is several, an average value of speeds of all of detected objects may be used, or a maximum value of the speeds of all of detected objects may be used.

The signal processor 312 of the first node streetlight 310 calculates the size of the lighting zone by using the speed and movement direction of the new object and a physical distance at which the node streetlights are installed (S308).

When the size of the lighting zone is calculated, the number of streetlights to be lit is determined. When the number of streetlights to be lit is determined, the number of communication streetlights that need to communicate with the first node streetlight 310 is determined. The size of the lighting zone varies automatically according to the movement speed of the new object.

The signal processor 312 of the first node streetlight 310 inputs the movement direction of the new object and the size of the lighting zone to the wireless communication unit 313 (S309).

The wireless communication unit 313 of the first node streetlight 310 sets communication streetlights that need to communicate among the plurality of node streetlights 310 to 360 according to the input value (S310).

The wireless communication unit 313 of the first node streetlight 310 determines a communication address of communication streetlights to communicate according to the size of the lighting zone. The communication address of the communication streetlights is referred from a communication network database within the wireless communication unit 313.

The wireless communication unit 313 of the first node streetlight 310 discriminates and sets the live lighting streetlight L and the pseudo lighting streetlight P among the communication streetlights, transmits the live lighting zone activation signal Ls to a wireless communication unit of a node streetlight set as the live lighting streetlight L, and transmits the pseudo lighting zone activation signal Ps to a wireless communication unit of a node streetlight set as the pseudo lighting streetlight P.

The number of the live lighting streetlights L is set in proportion to the size of the lighting area. The pseudo lighting streetlight P may be disposed subsequent to the live lighting streetlight L along a movement direction of the new object, and the number of the pseudo lighting streetlights P may be determined according to the number of the live lighting streetlights L or the size of the lighting zone.

The live lighting streetlights L is a streetlight that receives the live lighting zone activation signal Ls from the first node streetlight 310 and is turned on light with a preset dimming value immediately after receiving the live lighting zone activation signal Ls. Here, the set dimming value is 100%.

The pseudo lighting streetlight P is a streetlight that receives the pseudo lighting zone activation signal Ps from the first node streetlight 310 and is intended to be lit with the set dimming value at a preset lighting time. The lighting time is set as a time at which a predetermined time elapses after receiving the pseudo lighting zone activation signal Ps.

Hereinafter, in the present embodiment, referring to FIG. 7, an example in which, when the new object is detected in the first node streetlight 310, three node streetlights, i.e., the second, third, and fourth node streetlights 320, 330, and 340 are set as the live lighting streetlight L, and two node streetlights, i.e., the fifth and sixth node streetlights 350 and 360 disposed subsequent to the fourth node streetlight 340 are set as the pseudo lighting streetlight P, will be described.

Thus, the second, third, and fourth node streetlights 320, 330, and 340 are turned on light with the dimming value 100% immediately after receiving the live lighting zone activation signal Ls.

The fifth and sixth node streetlights 350 and 360 are not immediately turned on light but are in a standby state after receiving the pseudo lighting zone activation signal Ps and then is turned on light with the dimming value 100% at the lighting time at which the set time elapses.

In this case, the lighting time of the fifth node streetlight 350 and the lighting time of the sixth node street light 360 are set differently.

In the present embodiment, an example in which, when a plurality of pseudo lighting streetlights P are set, a lighting time of each of the plurality of pseudo lighting streetlights P is set so that they are sequentially turned on light at predetermined time intervals, will be described. That is, when the fifth node streetlight 350 that is a first lighting-intended streetlight is set to be turned on light after one minute after receiving the pseudo lighting zone activation signal Ps, the sixth node streetlight 360 that is a second lighting-intended streetlight may be set to be turned on light after two minutes that is twice one minute after receiving the pseudo lighting zone activation signal Ps.

As described above, the plurality of pseudo lighting streetlights P may be set to be sequentially turned on light at predetermined time intervals.

However, embodiments of the present invention are not limited thereto, and each lighting time of the plurality of pseudo lighting streetlights P may also be set to be gradually delayed in proportion to a distance between the live lighting streetlight L and the pseudo lighting streetlight P. Furthermore, the lighting time may also be set differently according to the movement speed of the new object.

Also, before the lighting time, the fifth and sixth node streetlights 350 and 360 may be maintained to be turned on light with the dimming value 30 to 50%. That is, the dimming value may be set as 30 to 50% in consideration of a nighttime or road safety situation.

Meanwhile, when the live lighting zone activation signal Ls is input to the pseudo lighting streetlight P in advance, the pseudo lighting zone activation signal Ps is inactivated. In this case, the pseudo lighting zone activation signal Ps may also be immediately inactivated or inactivated after a predetermined time elapses. That is, because the live lighting zone activation signal Ls is input and then lost, the pseudo lighting zone activation signals Ps may be not immediately inactivated but inactivated after a predetermined time elapses.

As described above, the live lighting streetlight L to be immediately lit after the new object is detected in the first node streetlight 310, is set so that signals can be transmitted, and the pseudo lighting streetlight P intended to be lit after a set time elapses, is also set so that signals can be transmitted.

Thus, an abnormal problem, such as a communication error in at least one among the second, third, and fourth node streetlights 320, 330, and 340 disposed subsequent to the first node streetlight 310, non-detection of the new object or a calculation error regarding the size of the lighting zone, occurs later and thus, even when the live lighting zone activation signal is not transmitted to the fifth node streetlight 350 or the sixth node streetlight 360, the fifth and sixth node streetlights 350 and 360 may be turned on light according to the pseudo lighting zone activation signal input in advance. That is, even when an abnormal problem, such as a communication error in any one among the plurality of node streetlights 310 to 360, non-detection of the object by using a motion detect sensor, or a calculation error regarding the size of the lighting zone, occurs, the node streetlights 310 to 360 may be normally turned on light so that stability can be improved.

Meanwhile, when it is determined that the object does not exist in the operation of determining the existence of the object (S302), the signal processor 312 of the first node streetlight 310 determines whether an object existence signal input in advance exists (S313).

When it is determined that the object existence signal input in advance does not exist in the first node streetlight 310, an object absence signal is newly input to the lighting controller 314 (S314).

Also, the lighting controller 314 of the first node streetlight 310 determines whether the first node streetlight 310 is at a lighting time according to the pseudo lighting zone activation signal Ps (S315).

That is, because, even when the first node streetlight 310 does not detect the object, the pseudo lighting zone activation signal Ps may be received from a node streetlight disposed subsequent to the first node streetlight 310, it is determined whether the current time it is the lighting time according to the pseudo lighting zone activation signal Ps.

When it is determined that the first node streetlight 310 is at the lighting time, the lighting controller 314 of the first node streetlight 310 determines whether a live lighting zone activation signal Ls input in advance exists (S316).

That is, because the live lighting zone activation signal Ls is first applied to the pseudo lighting zone activation signal Ps, it is determined whether the live lighting zone activation signal Ls is input in advance.

When it is determined that the live lighting zone activation signal Ls input in advance does not exist, the lighting controller 314 of the first node streetlight 310 sets the dimming value of the first node streetlight 310 as 100% and makes the first node streetlight 310 to be turned on light (S317).

That is, when the live lighting zone activation signal Ls input in advance does not exist in the first node streetlight 310, the first node streetlight 310 is not turned on light or turned on light with a preset dimming value or less so that the dimming value of the first node streetlight 310 is set up as 100% that is a rated value and the first node streetlight 310 is turned on light.

Meanwhile, when it is determined that the first node streetlight 310 is not at the lighting time, the lighting controller 314 of the first node streetlight 310 makes the current state of the first node streetlight 310 to be maintained (S312).

Because the object absence signal is input to the first node streetlight 310 and the first node streetlight 310 is not at the lighting time, the first node streetlight 310 is not turned on light or turned on light with the dimming value 30 to 50% that is a preset dimming value or less and thus is maintained in the current state.

Also, when it is determined that the live lighting zone activation signal Ls input in advance exists, the lighting controller 314 of the first node streetlight 310 makes the current state of the first node streetlight 310 to be maintained (S312).

When the live lighting zone activation signal Ls input in advance exists in the first node streetlight 310, the dimming value of the first node streetlight 310 is set as 100%, and the first node streetlight 310 has been already turned on light and thus is maintained in the current state.

Meanwhile, in the above embodiment, an example in which the signal processor 312 of the first node streetlight 310 calculates the speed and movement direction of the new object and the size of the lighting zone (S307)(S308), has been described. However, embodiments of the present invention are not limited thereto, and of course, the size of the lighting zone may be input by the user in advance by using a manual or semi-automatic method and stored.

The manual method is a method, whereby the user manually inputs the number of streetlights that need to be lit, as the size of a lighting zone during initialization of a system. The semi-automatic method is a method, whereby a plurality of lighting modes are previously set in the system and when the user selects one among the plurality of lighting modes during initialization, the number of streetlights that need to be lit, is set as the size of the lighting zone according to the selected mode. That is, in the semi-automatic method, the user selects a lighting mode without inputting the number of streetlights to be turned on light. For example, the plurality of lighting modes may include a power saving mode, a general mode, and a safety mode, and in the power saving mode, the number of streetlights to be turned on light is set as the smallest in advance, and in the safety mode, the number of streetlights to be turned on light is set as the largest in advance, and the user selects one among the lighting modes without the need of directly inputting the number of streetlights.

Thus, when the signal processor 312 of the first node streetlight 310 inputs an entrance signal of the new object to the wireless communication unit 313, the wireless communication unit 313 may set communication streetlights according to the preset size of the lighting zone.

Meanwhile, FIG. 8 is a view illustrating a state in which controlling of a streetlight according to a fourth embodiment of the present invention is implemented.

Referring to FIG. 8, an example in which first, third, and fifth motion detect sensors 411, 431, and 451 are installed in three streetlights, i.e., the first node streetlight 410, the third node streetlight 430, and the fifth node streetlight 450 among six node streetlights 410 to 460, will be described.

Figure 8A:
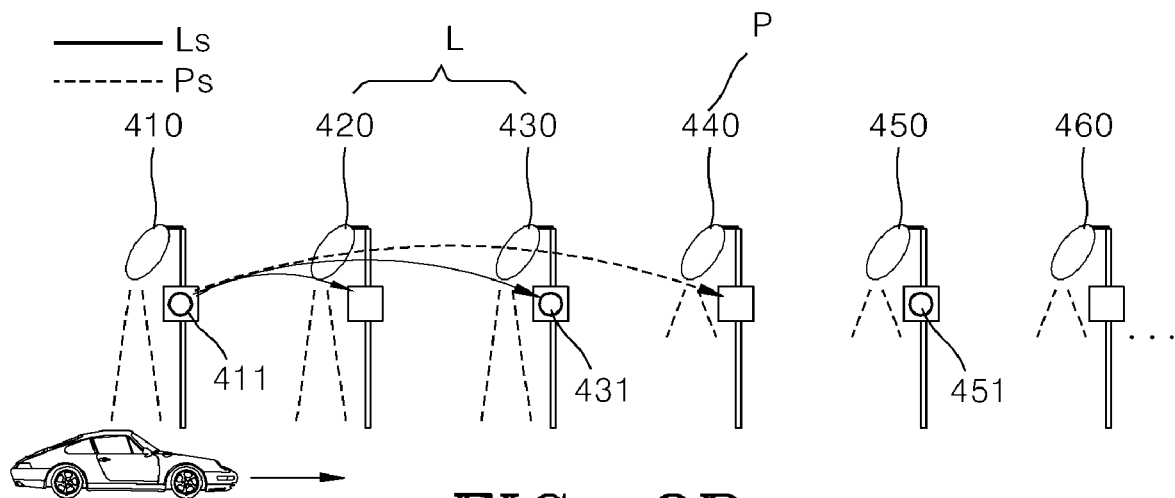
FIGS. 8A, 8B and 8C are views illustrating a state in which controlling of a streetlight according to a fourth embodiment of the present invention is implemented.

Referring to FIG. 8A, the motion detect sensor 411 of the first node streetlight 410 detects a new object.

A wireless communication unit of the first node streetlight 410 sets the second and third node streetlights 420 and 430 as a live lighting streetlight L, transmits a live lighting zone activation signal Ls, sets the fourth node streetlight 440 as a pseudo lighting streetlight P, and transmits a pseudo lighting zone activation signal Ps.

The second and third node streetlights 420 and 430 are turned on light with the dimming value 100% immediately after receiving the live lighting zone activation signal Ls.

The fourth node streetlight 440 is in a standby state after receiving the pseudo lighting zone activation signal Ps and then is turned on light with the dimming value 100% at a lighting time at which a set time elapses.

Figure 8B:
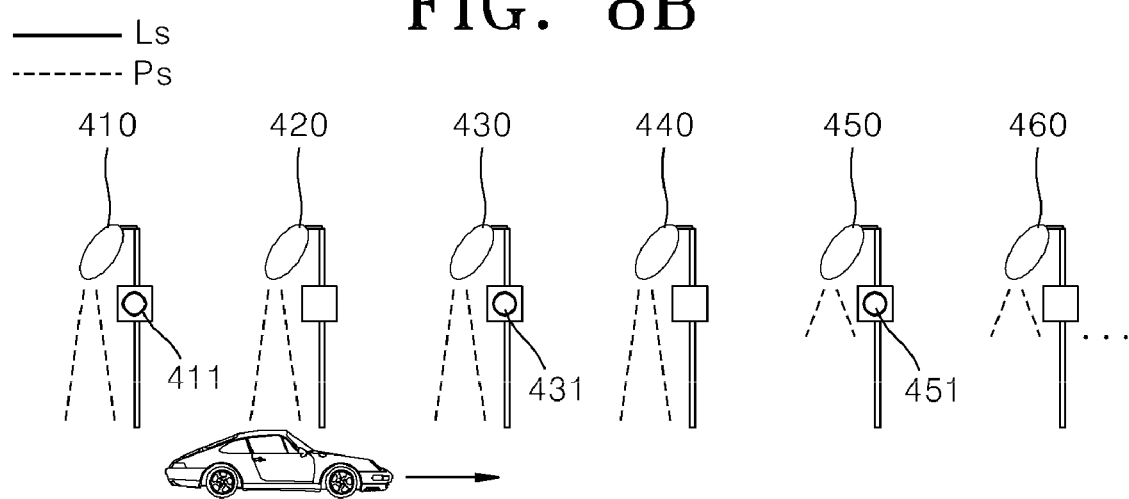

Subsequently, referring to FIG. 8B, the new object drives and passes through a lower portion of the second node streetlight 420.

Because a motion detect sensor does not exist in the second node streetlight 420, the second node streetlight 420 does not detect the new object and does not transmit a signal, such as the live lighting zone activation signal Ls or the pseudo lighting zone activation signal Ps, to a neighboring streetlight.

Even when the second node streetlight 420 does not transmit a signal, the second, third, and fourth node streetlights 420, 430, and 440 may be turned on light with the dimming value 100%.

That is, because the fourth node streetlight 440 has already received the pseudo lighting zone activation signal Ps from the first node streetlight 410, even when no additional signal exists, the fourth node streetlight 440 may be automatically turned on light with the dimming value 100% at the lighting time.

Figure 8C:
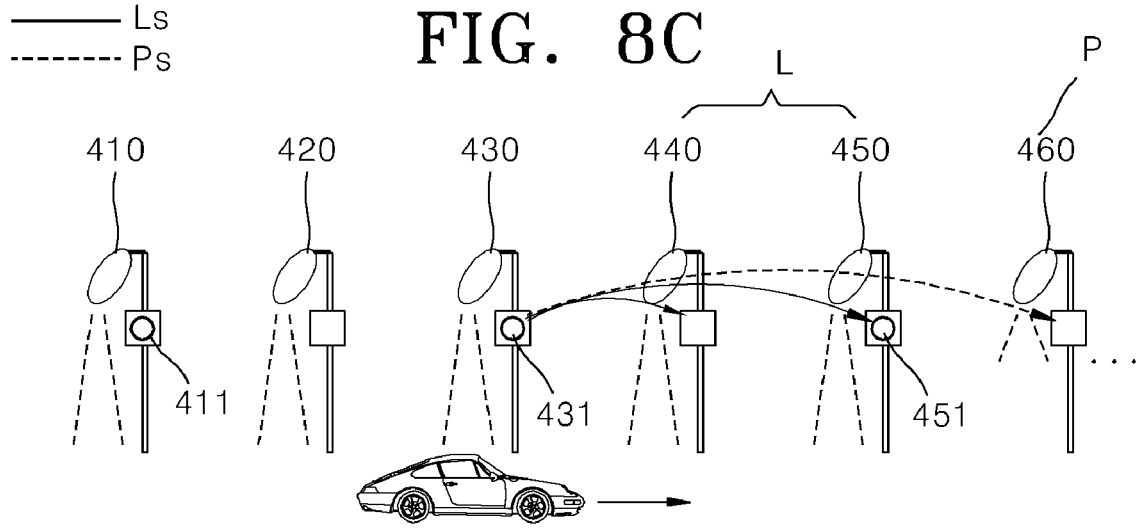

Referring to FIG. 8C, when the new object travels and passes through the lower portion of the third node streetlight 430, the motion detect sensor of the third node streetlight 430 detects the new object.

The wireless communication unit of the third node streetlight 430 sets the fourth and fifth node streetlights 440 and 450 as a live lighting streetlight L, transmits a live lighting zone activation signal Ls to the fourth and fifth node streetlights 440 and 450, sets the sixth node streetlight 460 as a pseudo lighting streetlight P, and transmits a pseudo lighting zone activation signal Ps to the sixth node streetlight 460.

The fourth and fifth node streetlights 440 and 450 are turned on light with the dimming value 100% immediately after receiving the live lighting zone activation signal Ls.

The sixth node streetlight 460 is in a standby state after receiving the pseudo lighting zone activation signal Ps and then is turned on light with the dimming value 100% at a lighting time at which a set time elapses.

In the fourth embodiment of the present invention having the above configuration, because the motion detect sensor does not need to be installed in all node streetlights, installation cost can be reduced.

In the present embodiment, an example in which one motion detect sensor is installed in each of two node streetlights, has been described. However, embodiments of the present invention are not limited thereto, and an installation interval of the motion detect sensors may be adjusted.

The installation interval of the motion detect sensors may be adjusted in consideration of a lighting time of the pseudo lighting zone activation signal.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRICAL APPLICABITURNED ON LIGHTY

According to the present invention, a control apparatus for a streetlight, whereby the brightness of a plurality of streetlights installed on a road can be more efficiently controlled, can be manufactured.

The invention claimed is:

1. A method for controlling a streetlight, comprising:
   detecting an existence of an object in a preset detection area by using a motion detect sensor installed in one first node streetlight among a plurality of node streetlights and transmitting a detected object existence signal to a signal processor;
   determining whether the object is a new object that approaches the detection area newly or an existing object that has been detected, when the signal processor receives the object existence signal;
   calculating a size of a lighting zone based on the first node streetlight by using the signal processor when it is determined that the object is the new object in the object-determining;
   inputting the object existence signal and a lighting zone activation signal to a lighting controller installed in the first node streetlight by using the signal processor and inputting a signal regarding the size of the lighting zone to a local area wireless communication unit installed in the first node streetlight;
   setting at least one or more streetlights included in the lighting zone among the plurality of node streetlights adjacent to the first node streetlight as an additional lighting streetlight and transmitting the lighting zone activation signal to the additional lighting streetlight when the local area wireless communication unit receives the signal regarding the size of the lighting zone; and
   controlling a dimming value of the first node streetlight according to the object existence signal and the lighting zone activation signal so as to turn on a light of the first node streetlight when a lighting controller of the first node streetlight receives the object existence signal and the lighting zone activation signal in the signal-inputting and controlling a dimming value of the additional lighting streetlight according to the lighting zone activation signal so as to turn on a light of the additional lighting streetlight when a lighting controller of the additional lighting streetlight receives the lighting zone activation signal in the communicating.

2. The method of claim 1, wherein, when it is determined that the object is not the new object but the existing object in the object-determining, a current lighting state of the first node streetlight is maintained.

3. The method of claim 1, wherein, when it is determined that no previously input object existence signal exists in the turning on light, the lighting controller of the first node streetlight sets a dimming value of the first node streetlight up as a rated value or more and turns on the light of the first node streetlight, and when it is determined that the previously input object existence signal exists, the lighting controller of the first node streetlight maintains a current lighting state of the first node streetlight.

4. The method of claim 1, wherein, when it is determined that the previously input object existence signal does not exist in the turning on light, the lighting controller of the additional lighting streetlight sets a dimming value of the additional lighting streetlight up as a rated value or more and turns on the light of the additional lighting streetlight, and when it is determined that the previously input object existence signal exists, the lighting controller of the additional lighting streetlight maintains a current lighting state of the additional lighting streetlight.

5. The method of claim 1, wherein, when the signal processor does not receive the object existence signal from the motion detect sensor, the signal processor determines whether a previously input object existence signal exists in the lighting controller, and when it is determined that the previously input object existence signal exists, the signal processor inputs an object absence signal to the lighting controller, and when the object absence signal is input to the lighting controller, the lighting controller controls a dimming value of the first node streetlight differently according to an existence of a previously input lighting zone activation signal.

6. The method of claim 5, wherein, when the object absence signal is input to the lighting controller, the lighting controller determines whether a previously input lighting zone activation signal exists, and when it is determined that the previously input lighting zone activation signal does not exist, the lighting controller turns on the light of the first node streetlight according to a preset dimming value, and when it is determined that the previously input lighting zone activation signal exists, the lighting controller sets a dimming value of the first node streetlight up as a rated value and turns on the light of the first node streetlight.

7. The method of claim 5, wherein, when the object absence signal is input to the lighting controller, the lighting controller determines whether a previously input lighting zone activation signal exists, and when it is determined that the previously input lighting zone activation signal does not exist, the lighting controller turns on the light of the first node streetlight according to a preset dimming value, and when it is determined that the previously input lighting zone activation signal exists, the lighting controller maintains a current lighting state of the first node streetlight.

8. The method of claim 1, wherein, in the calculating of the lighting zone, the signal processor calculates a movement direction and a movement speed of the new object and calculates a size of the lighting zone according to the movement direction and the movement speed based on the first node streetlight.

9. The method of claim 1, wherein, in the communicating, a local area wireless communication unit of the first node streetlight sets communication streetlights to communicate among the plurality of node streetlights and sets the additional lighting streetlight among the communication streetlights as a live lighting streetlight, and the lighting zone activation signal is a live lighting zone activation signal, and at least one among streetlights disposed subsequent to the live lighting streetlight in a movement direction of the new object among the communication streetlights is set as a pseudo lighting streetlight, and a pseudo lighting zone activation signal is transmitted to the pseudo lighting streetlight.

10. The method of claim 9, wherein a light of the live lighting streetlight is turned on with a preset dimming value immediately after receiving the live lighting zone activation signal, and a light of the pseudo lighting streetlight is automatically turned on with the set dimming value at a lighting time set as a time at which a predetermined time elapses after receiving the pseudo lighting zone activation signal.

11. The method of claim 9, wherein, when a plurality of pseudo lighting streetlights are set, a lighting time of each of the plurality of pseudo lighting streetlights is set so that lights of the plurality of pseudo lighting streetlights are sequentially turned on at predetermined time intervals.

12. The method of claim 9, wherein, when a plurality of pseudo lighting streetlights are set, a lighting time of each of the plurality of pseudo lighting streetlights is set to be delayed in proportion to a distance between the live lighting streetlight and the pseudo lighting streetlight.

13. The method of claim 9, wherein, when the live lighting zone activation signal is previously input to the pseudo lighting streetlight, the pseudo lighting zone activation signal is inactivated.

14. The method of claim 9, wherein, when the live lighting zone activation signal is previously input to the pseudo lighting streetlight, the pseudo lighting zone activation signal is inactivated after a predetermined time elapses.

15. The method of claim 9, wherein, when the live lighting zone activation signal is newly input to the pseudo lighting streetlight, the pseudo lighting zone activation signal is inactivated.

16. The method of claim 9, wherein the signal processor of the first node streetlight calculates a speed and a movement direction of the new object and calculates a size of the lighting zone according to the calculated speed and movement direction, and a wireless communication unit of the first node streetlight determines a communication address of the communication streetlights according to the calculated size of the lighting zone.

17. The method of claim 9, wherein the plurality of node streetlights are set as groups each including a predetermined number of node streetlights, and the motion detect sensor is installed in at least one node streetlight for each of the groups.

18. The method of claim 9, wherein, when the signal processor of the first node streetlight determines that the object does not exist, the signal processor of the first node streetlight determines whether a previously input object existence signal exists in the first node streetlight, and when it is determined that the previously input object existence signal does not exit, the signal processor of the first node streetlight inputs an object absence signal, and after the object absence signal is input, the signal processor of the first node streetlight determines whether a current time is a lighting time according to the pseudo lighting zone activation signal, and when it is determined that the current time is the lighting time, the signal processor of the first node streetlight determines that the live lighting zone activation signal is previously input, and when it is determined that an input of the live lighting zone activation signal does not exist, the signal processor of the first node streetlight sets a dimming value of the first node streetlight as the set dimming value and turns on the light of the first node streetlight, and when it is determined that an input of the live lighting zone activation signal exists, the signal processor of the first node streetlight maintains a turned on state of the first node streetlight.

19. A control apparatus for a streetlight, comprising:
a signal processor determining an existence of an object according to a signal received from a motion detect sensor, and when it is determined that the object exists, determining whether a previously input object existence signal exists, and when the previously input object existence signal does not exist, generating an object existence signal newly, and when it is determined that the object does not exist and the previously input object existence signal does not exist, generating an object absence signal, and when it is determined that the object exists, determining whether the object is a new object or an existing object, and when it is determined that the object is the new object, calculating a size of a lighting zone;
a lighting controller turning on a light with a preset dimming value when receiving the object existence signal from the signal processor, and when the object absence signal is received from the signal processor and a lighting zone activation signal is received from one among peripheral streetlights, turning on the light with a preset dimming value; and
a local area wireless communication unit setting at least one more streetlights included in the lighting zone among the peripheral streetlights as an additional lighting streetlight according to the size of the lighting zone and transmitting the lighting zone activation signal to the additional lighting streetlight.

* * * * *